United States Patent [19]

Boehm

[11] Patent Number: 4,733,795

[45] Date of Patent: Mar. 29, 1988

[54] STEAM PRESSURE COOKING POT WITH A SEAL SECURING THE INSIDE SPACE OF THE POT AGAINST A DROP IN PRESSURE

[76] Inventor: Hans-Georg Boehm, Kellergrundweg 13, 6242 Kronberg/Ts., Fed. Rep. of Germany

[21] Appl. No.: 50,639

[22] Filed: May 13, 1987

[30] Foreign Application Priority Data

May 30, 1986 [DE] Fed. Rep. of Germany ....... 3618269

[51] Int. Cl.⁴ .............................................. B65D 45/00
[52] U.S. Cl. .................................................. 220/316
[58] Field of Search ............... 220/316, 293, 319, 203; 292/256.6

[56] References Cited

U.S. PATENT DOCUMENTS

| | | | |
|---|---|---|---|
| 4,434,909 | 3/1984 | Ott | 220/316 |
| 4,470,515 | 9/1984 | Boehm | 220/316 |
| 4,620,643 | 11/1986 | Selillotte | 220/316 |
| 4,685,587 | 8/1987 | Selillotte | 220/316 |

Primary Examiner—George T. Hall

Attorney, Agent, or Firm—Merchant, Gould, Smith, Edell, Welter & Schmidt

[57] ABSTRACT

The invention concerns a steam pressure cooking pot consisting of a container accommodating the product to be cooked, a cover with safety valve capable of being placed thereupon, a locking means clamping container and cover to one another in the closed condition, and a seal disposed between cover and container securing the inside space of the pot against a drop in pressure in the closed condition, with a sealing lip of the seal pointing radially inwardly lying against the cover or the container which, upon pressing down on the cover in the direction toward the container, lifts off from the sealing emplacement on the cover or on the container, and with the cover or container, upon subsequent movement of the cover into the opening condition, executing a relative movement toward the sealing lip. Disposed radially outside the edge of the sealing lip, between the sealing lip and the cover or the container, is a slide element that acts as a levered support for the lifting movement of the sealing lip.

11 Claims, 12 Drawing Figures

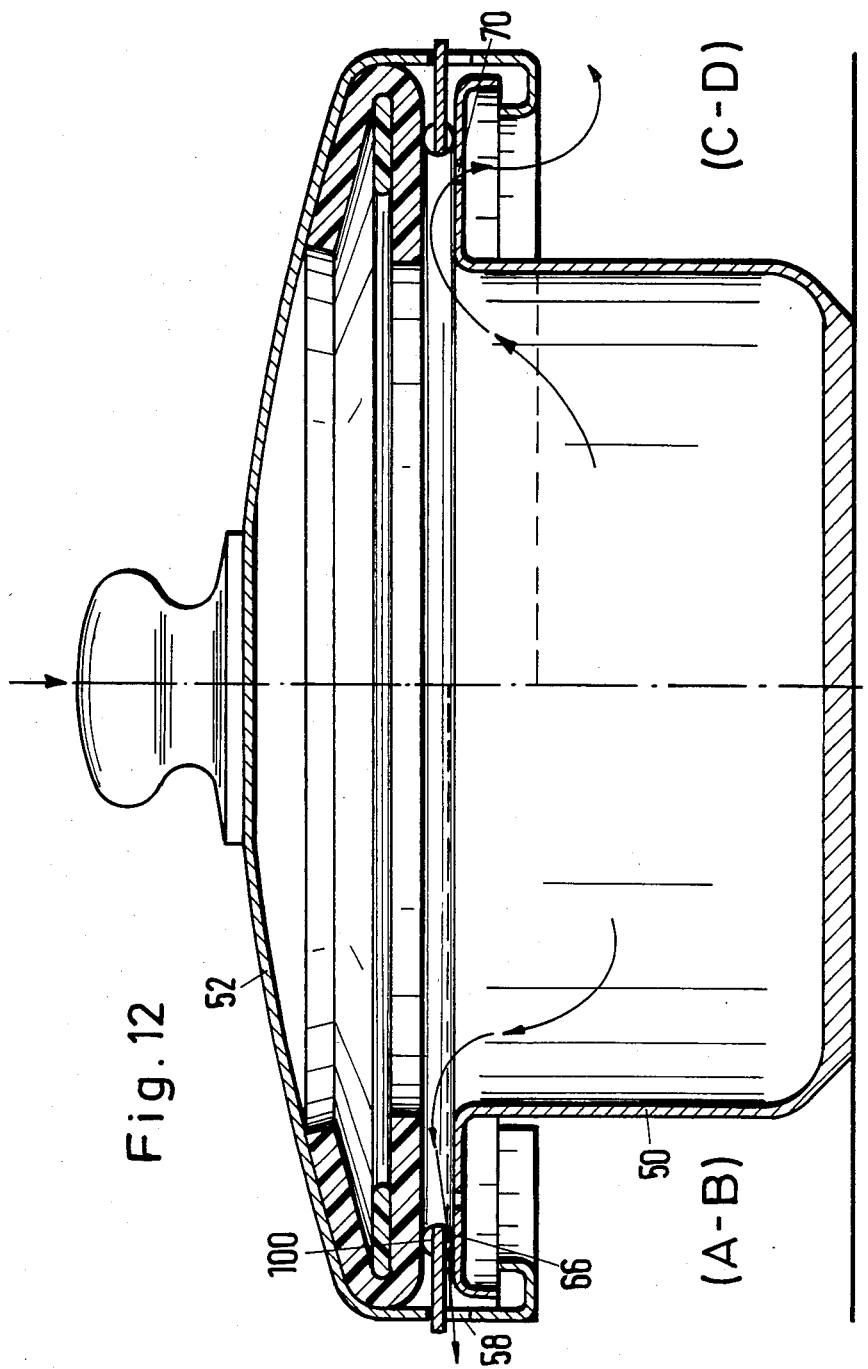

STEAM PRESSURE COOKING POT WITH A SEAL SECURING THE INSIDE SPACE OF THE POT AGAINST A DROP IN PRESSURE

TECHNICAL FIELD

The invention concerns a stem pressure cooking pot.

BACKGROUND OF THE INVENTION

Existing inside a steam pressure cooking pot after it has been heated is a high pressure. In the case of modern steam pressure cooking pots, it is possible, with one hand, to relieve the high pressure (by opening the seal) without danger, as well as unlock and lift off the cover.

In the case of the steam pressure cooking pot known from U.S. Pat. No. 4,434,909, the seal is provided with radial ribs that have no function in the closed condition but, when pushing down on the cover, they lift the seal from the container and/or the cover in lever-supporting fashion. Therefore, the high pressure can be relieved with one hand.

Disadvantageous in the case of this known steam pressure cooking pot is that rotation of the pushed-down cover requires considerable force because, in so doing, the radial ribs, pressed against the container and/or the cover, must glide (slide) perpendicularly to their longitudinal extension. This makes operation considerably more difficult. In doing this, the sealing lip is also subjected to wear and possibly to damage since the stress is concentrated over small areas of contact. The task for the invention is to obtain a one-hand operated steam pressure cooking pot of this type that is inexpensive to manufacture, subject to lesser wear and that permits complete as well as rapid relief of the high pressure prior to opening the pot.

SUMMARY OF THE INVENTION

For resolving this task, the steam pressure cooking pot displays, in accordance with the invention, the features defined in patent claim 1.

Advantageous embodiments are described in the subclaims.

Because of its simple construction, the steam pressure cooking pot in accordance with the invention can be manufactured without any great expense. Prior to opening, the slide element lifts the sealing lip from the cover and/or from the container and thereby enables a rapid escape of the high pressure. Slide element and sealing lip, working in cooperation with one another, are hardly stressed, and then only in distributed fashion over a greater contacting surface, so that wear remains slight. In the case of a seal with two sealing lips, which contact respectively the cover and the container, the slide element can be optionally combined with one or the other. The steam pressure cooking pot can be constructed cylindrically or with rectangular surfaces.

Whether separating of cover and container is accomplished by rotation of the cover relative to a cylindrical container or by pushing off the cover horizontally from a square-cornered container, the slide element simplifies cover movement and avoids wear of the sealing lip—at that time completely lifted off.

BRIEF DESCRIPTION OF THE DRAWINGS

Explained in the following with the aid of the attached drawings are preferred forms of embodiment of the invention.

Shown are:

FIG. 12, partial cuts in accordance with lines A-B and C-D in FIG. 11.

DETAILED DESCRIPTION OF THE INVENTION

Figure 1:
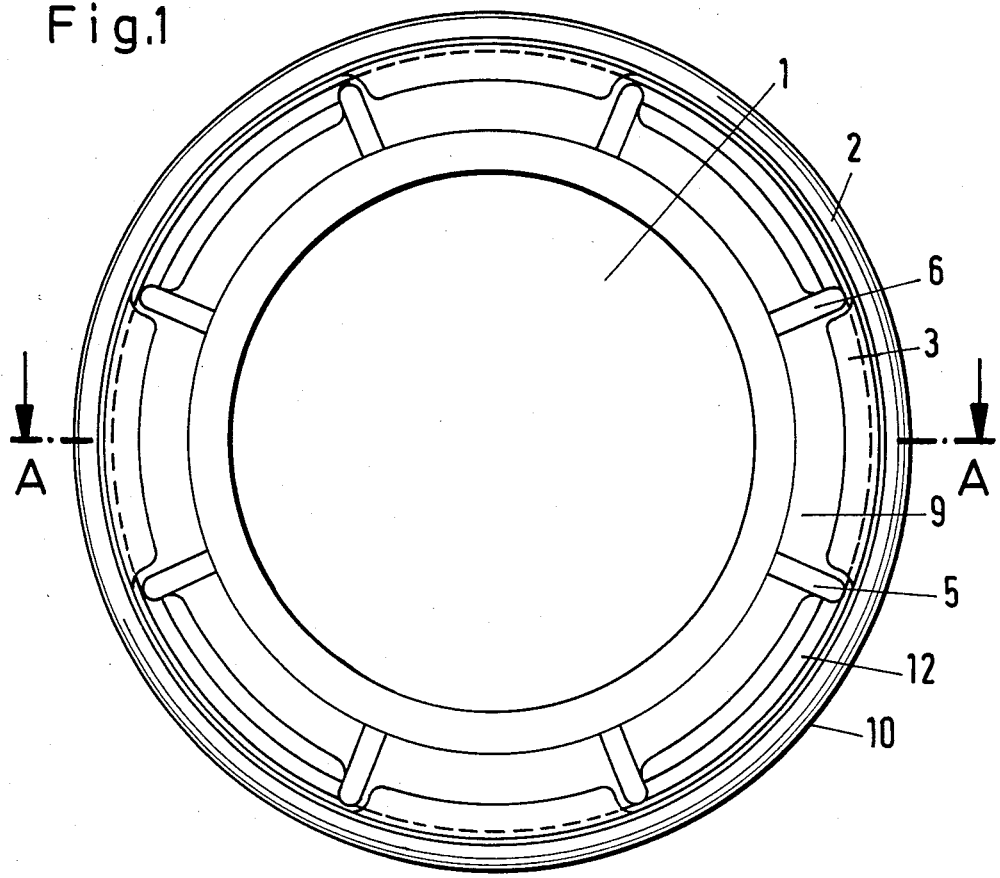
FIG. 1, a first form of embodiment of the steam pressure cooking pot, from under, in the locked condition.

FIGS. 1-6 show a container 1 for the product to be cooked, open at the top, with a continuous container rim 9 from whose periphery project, radially outwardly, segmented rim projections 4.

Distributed over the periphery, extending underneath the container rim 9, alternately downwardly and radially outwardly up to near the outer edge of the rim projections 4, are stops 5 and lugs 6. The radial extension of stops 5 and lugs 6 is essentially the same (FIGS. 1, 3 and 5); the stops 5, however, extend downwardly a little less than studs 6.

The stops 5 and studs 6 in each case lie against the peripheral ends of the rim projections 4. Together with complementary means of the cover to be described later, they form a closure (locking) means.

The cover rim 10 of a cover 2 (FIGS. 2, 4 and 6) projects all around over the container 1 for the product to be cooked. The cover 2 arches outwardly, slightly downwardly, up to the cover rim 10 and then inwardly for forming an inwardly open channel for accommodating the yet to be described seal 11.

Extending underneath the inwardly arched area of the cover rim 10, downwardly from the cover rim 10, is a ring-like, straight shoulder 33.

Projecting radially inwardly from the shoulder area 33 are cover rim projections 3 and forming segments of arcs of a circle that are complimentarily similar to the container rim projections 4. When each cover rim projection 3 lies inside a rim gap 13 between two container rim projections 4 (FIG. 3), the cover rim projections 3 can pass through downwardly between the cover rim projections 4.

Figure 4:
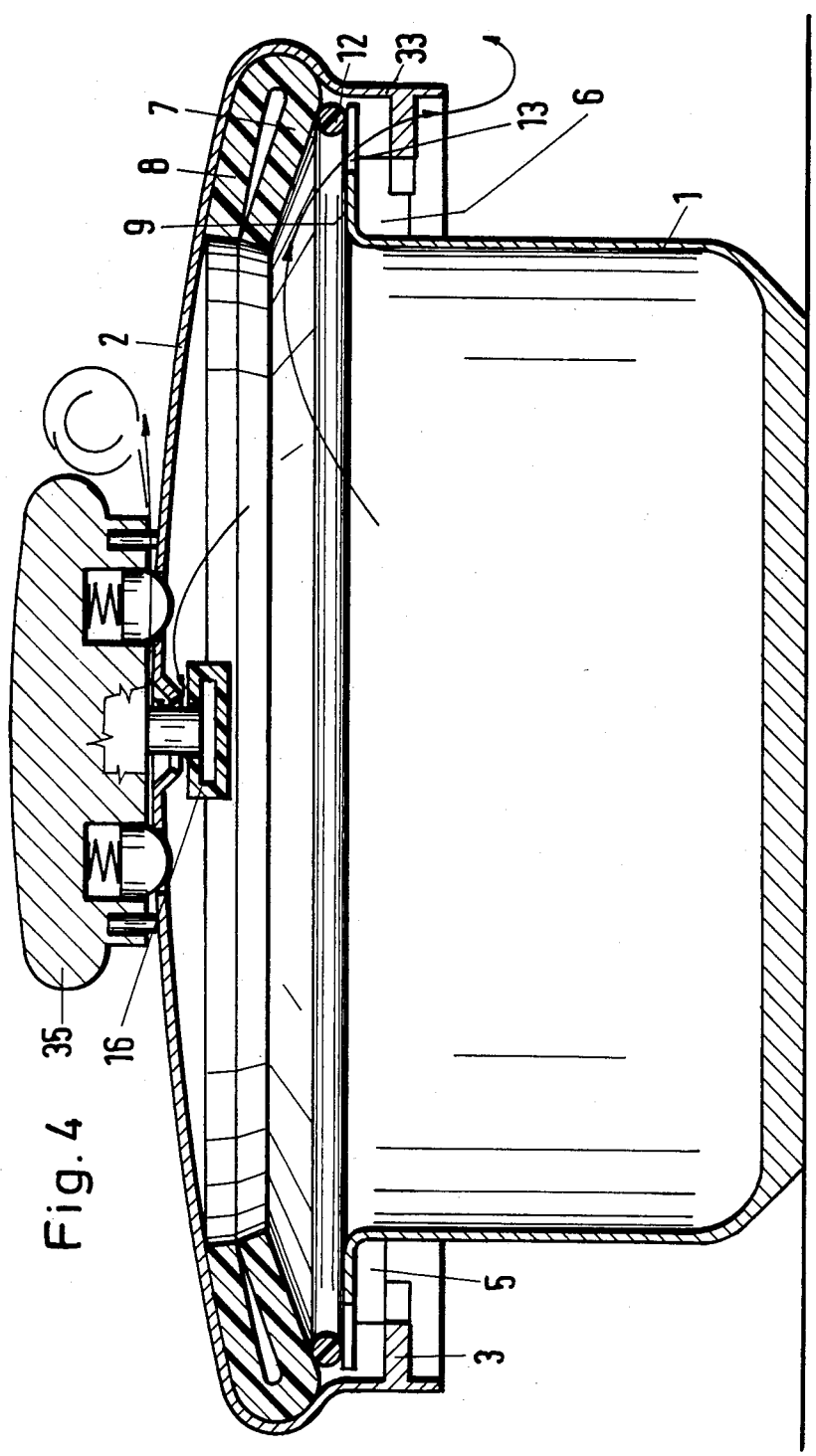
FIG. 4, a vertical cut along the line B—B in FIG. 3 with the cover pushed down.

Upon pressing down the cover 2, its rim projections 3 move out over the lower edges of the stops 5 so that cover 2 is rotatable relative to the container 1 for the product to be cooked. Capable of being recognized on the left hand side of FIG. 4 is that the cover rim projections 3 lie, with their top side, against the under side of the stops 5. Capable of being recognized on the right hand side of the figure is that the greater downward extension of lugs 6 relative to the stops 5 limits rotation of the cover 2.

Figure 2:
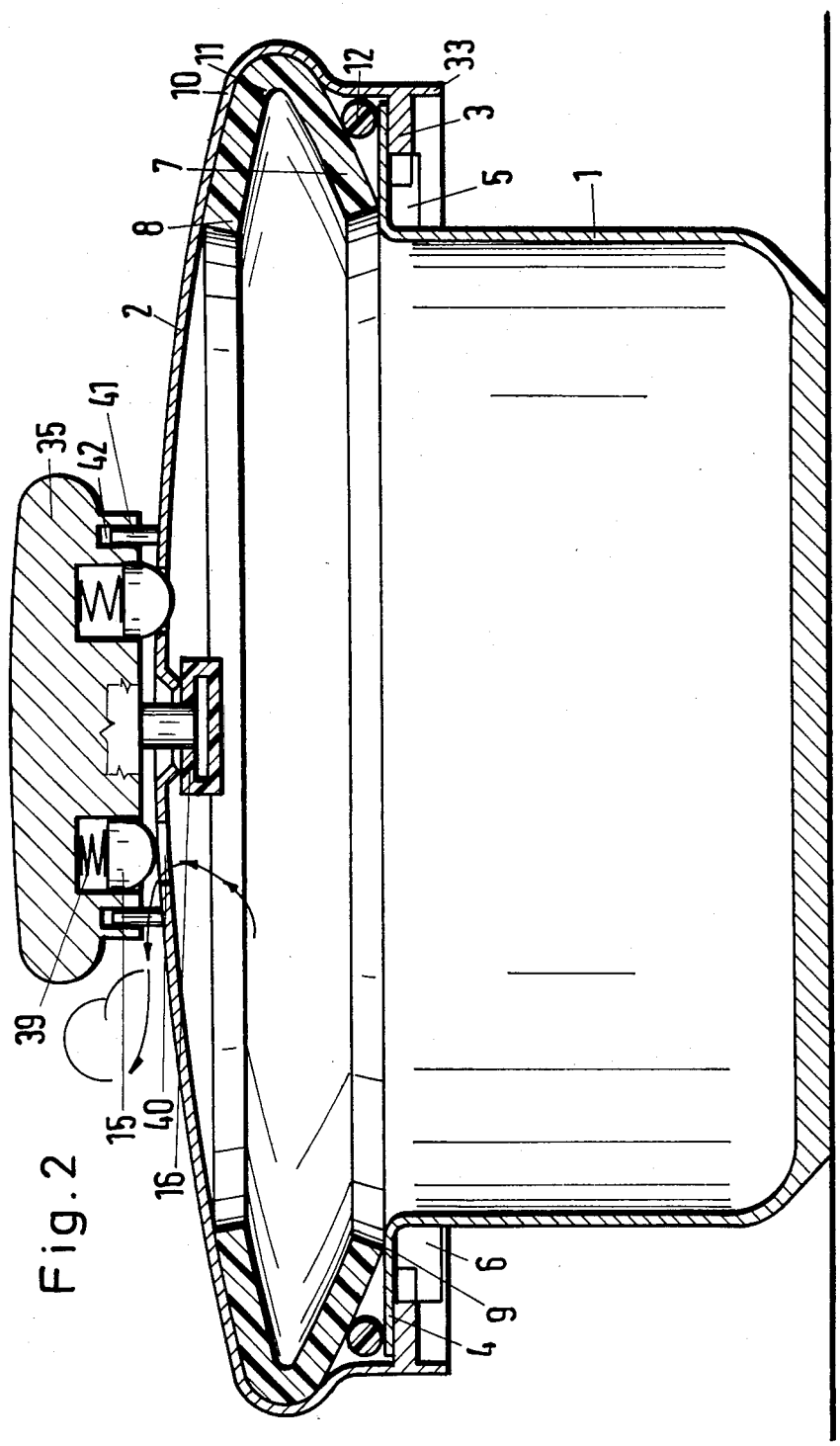
FIG. 2, a vertical cut of the steam pressure cooking pot along the line A—A in FIG. 1.
Figure 5:
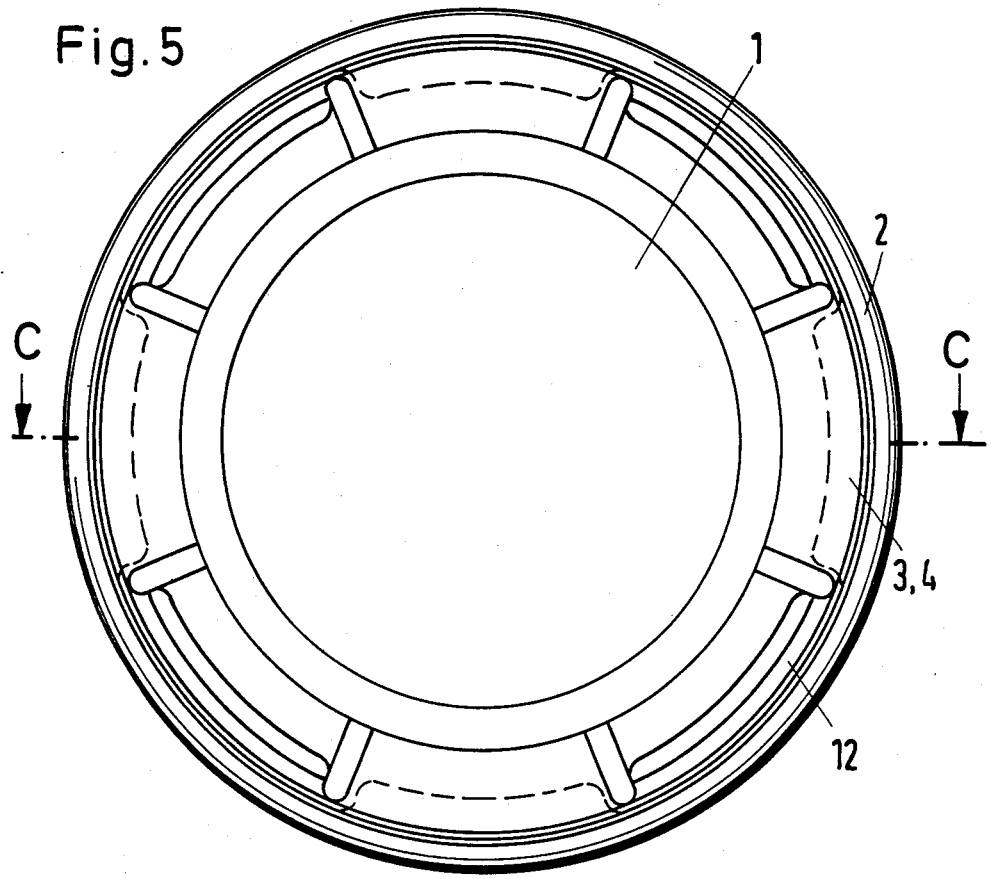
FIG. 5, the steam pressure cooking pot, from under, with loosely emplaced (fitted) cover.
Figure 6:
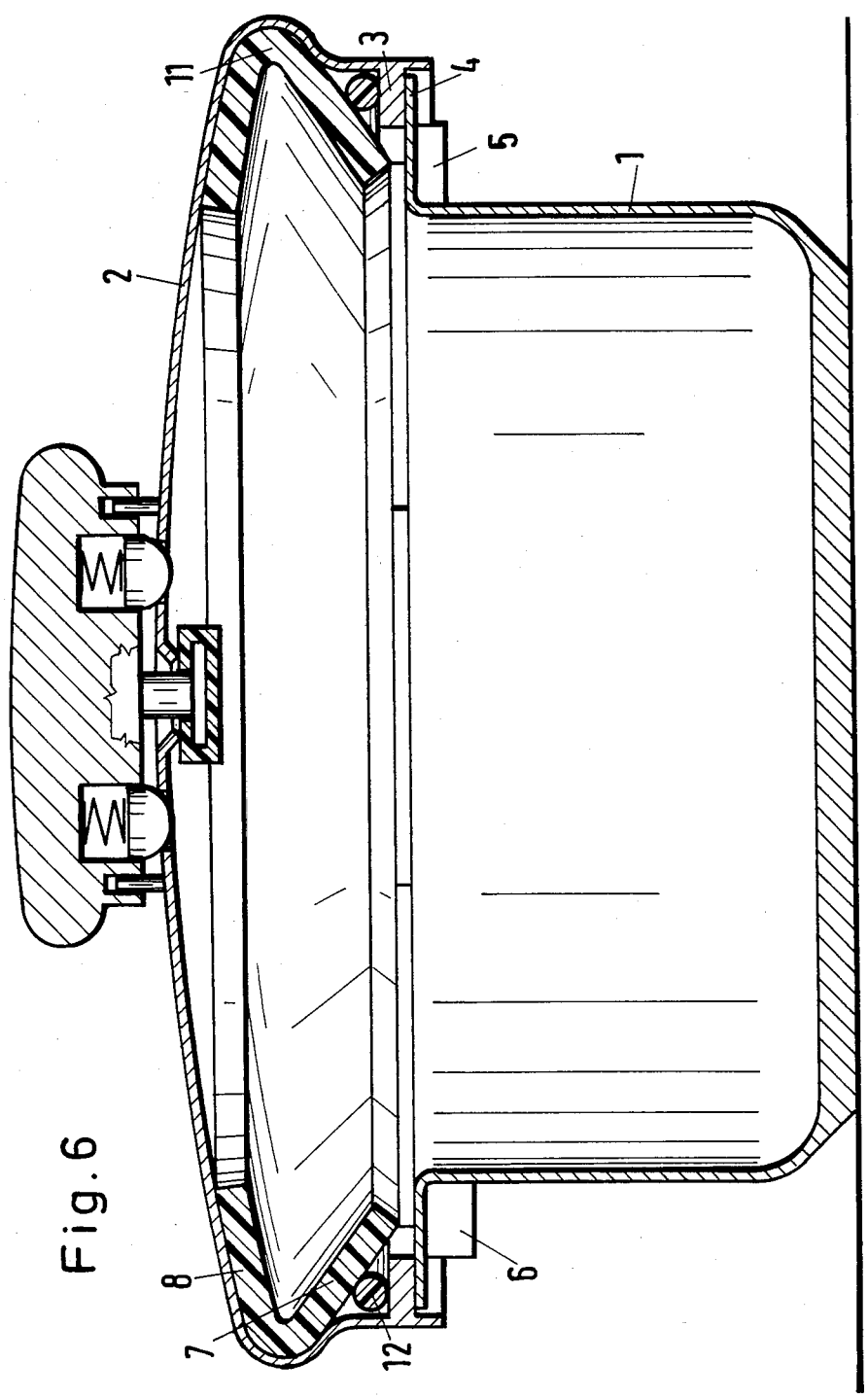
FIG. 6, a vertical cut along the line C—C in FIG. 5.

First, the cover 2, as is shown in FIGS. 5 and 6, is placed in any arbitrary position on the rim of the container 1 for the food to be cooked. The cover rim projections 3 lie on the top side of the container rim projections 4 facing away from the bottom of the container 1 for the product to be cooked. Now, cover 2 is rotated until the cover rim projections lie in the rim gaps 13 (FIG. 3) and is then pressed down (FIG. 4). It is then rotated further until the cover rim projections 3 lie laterally against lugs 6. As FIGS. 1 and 2 show, when released the cover can move upwardly in limited fashion until the cover rim projections 3 come into contact against the container rim projections 4 (FIG. 2). This is the operating position of the locking (closure) means of the steam pressure cooking pot.

For unlocking the cover 2, the just described process is executed in the reverse order.

The cover 2 displays a seal 11 which—radially inwardly—is of V-shaped cross section and, therefore, forms two sealing lips 7, 8. Seal 11 extends as a closed, essentially circular profile, over the entire circumference of the cover rim 10. Its one, top sealing lip 8 lies flatly on the under side of the cover 2, while its other, lower sealing lip 7, with cover 2 removed, projects from the cover rim 10 inwardly and freely inclined downwardly. The free end of this lower sealing lip 7, with cover 2 installed, lies on the container rim 9 of the container 1 for the product to be cooked and seals the cover 2 against the container 1 for the product to be cooked.

Lying underneath the lower sealing lip 7 as the slide element 12 is a closed ring made of a material providing a slide-pairing with the container 1, respectively cover 2, of least possible frictional contribution, for example made of metal or of hard plastic. The seal consists, for example, of an NBR-elastomer or synthetic rubber, possibly silicon rubber.

The external diameter of the slide element is almost as great as the internal diameter of the shoulder area 33. In this fashion, the slide element 12 cannot jump out of its position between sealing lip 7, shoulder area 33 and cover rim projections 3.

Figure 3:
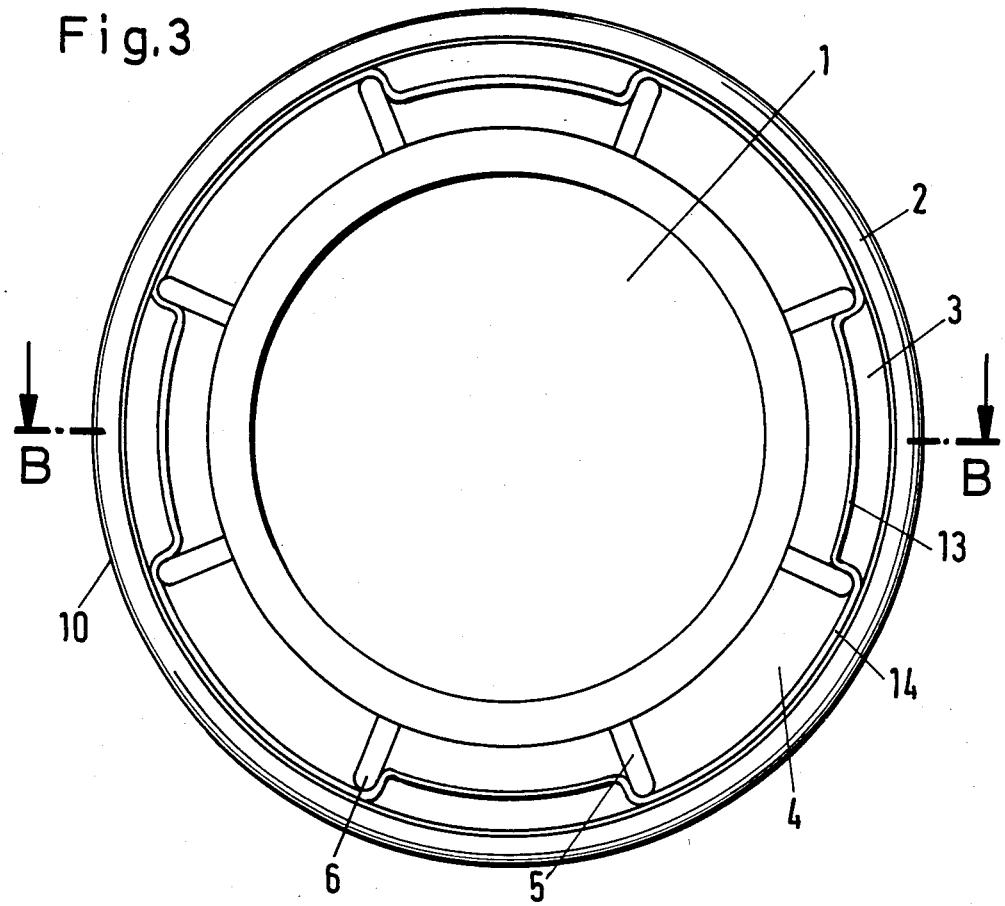
FIG. 3, the steam pressure cooking pot, from under, in the unlocked condition.

If the cover, loosely emplaced, for example in accordance with FIGS. 5 and 6, is brought into the position shown in FIGS. 3 and 4 in which the container rim projections 4 enter into the rim gaps 14 of the cover rim 10, slide element 12 comes into contact with the container rim projections 4. Upon pressing down the cover 2, it is held by these latter and lifted up from its contact at the cover rim projections 3.

Through means of the lever-supported relative-like positioning of the slide element 12 toward the under side of the lower sealing lip 7, the sealing lip 7, upon pressing down the cover 2, is swung upwardly (FIG. 4). This movement of the sealing lip 7 can continue up until contact at the under side of the top sealing lip 8.

The spring force of the seal 11 would essentially render rotation of the cover 2 more difficult if the sealing lip 7 were to lie against the container rim 9. The essentially lesser friction between the slide element 12 and the container rim 9 makes rotation of the cover 2 essentially easier; since, additionally, the sealing lip 7 is completely pivoted away from the container rim 9, the friction between the slide element and the container rim 9 is the sole counterforce when rotating cover 2.

Because of the relatively high degree of stiffness of the slide element 12, this latter can support the lower sealing lip 7 in the area of the rim gaps 13, without itself needing to be supported on the under side. The slide element 12, therefore, contributes to preventing excessive deformation of the sealing lip 7 in this area, which could lead to unsealing the steam pressure cooking pot.

With high pressure inside the steam pressure cooking pot, the sealing lip 7 is pressed so strongly against the container rim 9 that, together with the action of the pressure on the under side of the cover 2 and the rotation-hindering action of stops 5 and lugs 6, rotation of the cover 2 is impossible with persisting high pressure.

A safety valve disposed inside the knob grip 35 limits the high pressure and comprises a valve opening 40 that forms a seat for a valve body 15. The valve body 15 is displaceably guided in a vertical pocket boring of the knob grip 35 and is pressed toward the valve opening 40 of cover 2 by a spring 39. The spring force of the spring 39 is adjusted to the desired operating high pressure.

The knob grip 35 is provided with borings 42 on the under side into which engage follower pins 41 that are attached to the cover 2. These borings 42, exactly like the borings accommodating the valve body 15, are disposed eccentrically to the central axis of the knob grip 35.

Centrally to the central axis of the knob grip 35, this latter carries an extension 16 that projects through a central opening of the cover 2. With interposition of a suitable sealing ring, the extension 16 of the knob grip 35 forms, with the under side of the cover 2, a steam pressure relief valve that can be opened by pressing on the knob grip 35.

If the cooking process has ended, the knob grip 35 is pressed down. In so doing, first escaping is part of the high pressure through the relief valve 16 (FIG. 4). With further pressure on the knob grip 35, the entire cover 2 is pressed down. In doing this, the lower sealing lip 7 is swung upwardly lever-fashion about its point of contact at the slide element 12; the remaining high pressure can escape through the rims 13, 14. Since there is available here for this, measured at the relief valve, a very large cross section, the steam pressure cooking pot becomes completely pressureless very rapidly. Then, cover 2 can be rotated and unlocked.

Figure 7:
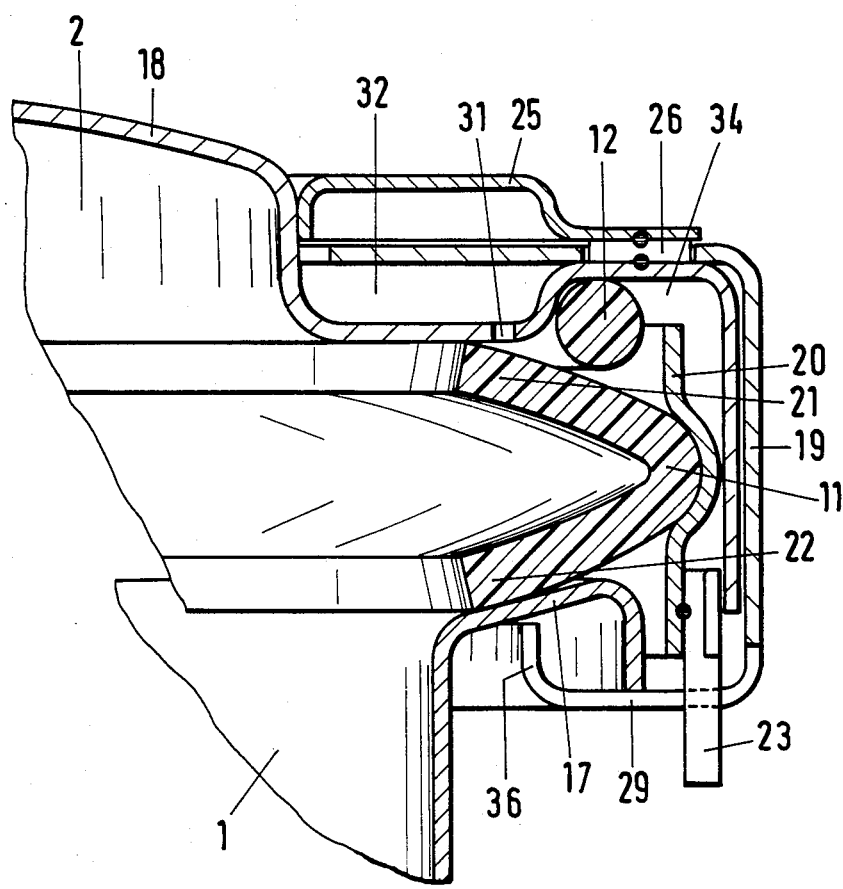
FIG. 7, a broken away partial cut of a second form of embodiment of the steam pressure cooking pot in the locked condition.
Figure 8:
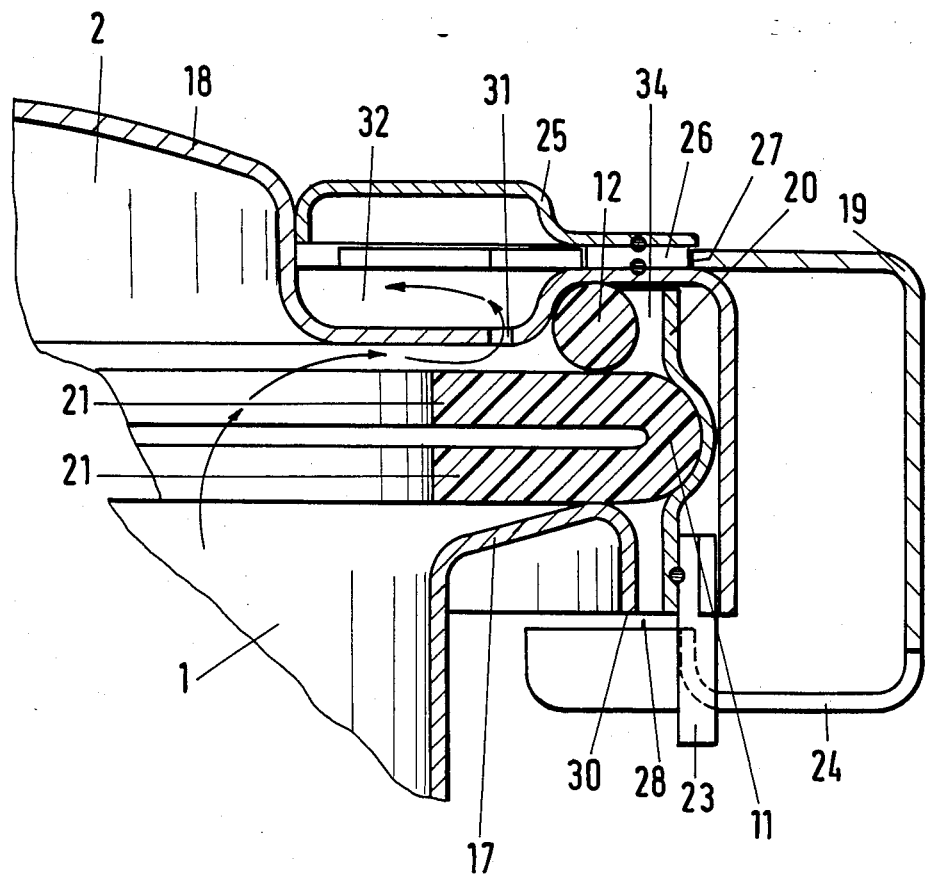
FIG. 8, a corresponding partial cut of the unlocked steam pressure cooking pot with cover pushed down.
Figure 9:
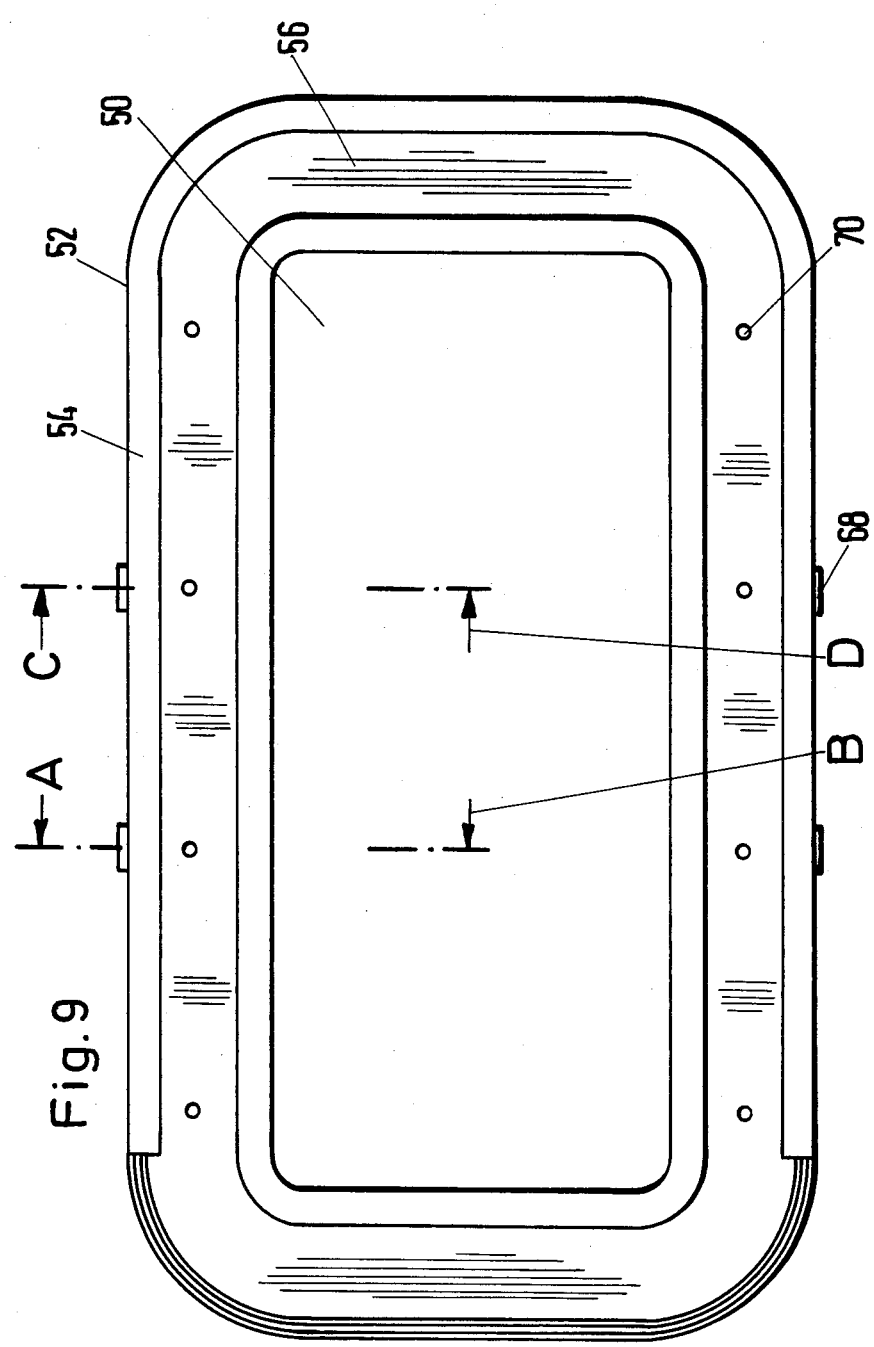
FIG. 9, a view of a third form of embodiment of the steam pressure cooking pot, from under, in the closed condition.
Figure 10:
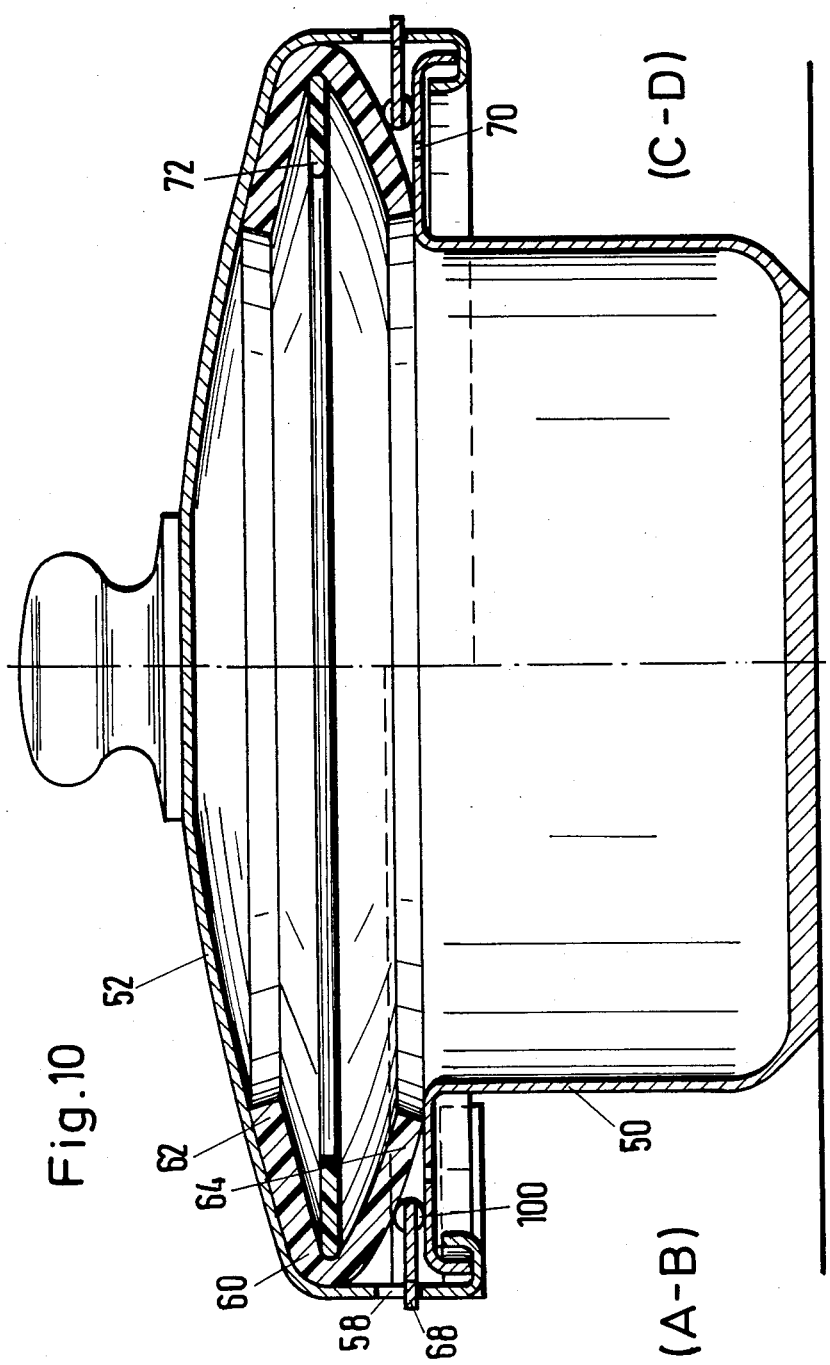
FIG. 10, partial cuts in accordance with lines A-B and C-D in FIG. 5.

A second preferred form of embodiment of the steam pressure cooking pot is shown in FIGS. 7 and 8. The container 1 for the product to be cooked displays a circular, smooth container rim 17. A cover 2 includes a dome 18 forming its main body. At its outer circumference, the dome 18 displays a somewhat rectangular cross section, open toward the top, that is enclosed radially outwardly by a second groove 31 open toward the bottom. Lying at the outer rim of the cover 2 is a frame ring 20 in the form of a perpendicular strip of sheet metal closed toward the ring, with a circular groove arched radially outwardly pressed out at its mid-height for retaining the outer periphery of a seal 11, corresponding to the one already described.

Extending downwardly over the lower edge of the frame ring 20 are fingers 23.

On the top side of the dome 18, extending in non-displaceable fashion over both grooves 32, 35 in a radially outward direction is a covering ring 25.

Provided between the covering ring 25 and the dome 18, separated from one another in the circumferential direction of the cover 2, are brackets 19 that are movable in their radial as well as in their circumferential direction relative to the cover 2.

Located in slots 27 of the brackets 19 are slide rings 26 that are held between the bottom of the second groove and the covering ring 25. Added on to the lower edge of the brackets 19 is a horizontal locking area 29.

At the radially inward end of the locking area 29, gripping behind the outer rim of the container rim 17, in the locking position of the cover, is a shoulder 36.

The locking area 29 displays a slot 24 through which extends a finger 23 of the frame ring 20. In this manner, the brackets 19 can only be displaced radially.

As is shown in particular in FIG. 7, seal 11 lies, with one top sealing lip 21, against the under side of the dome 18. Provided radially outwardly from the contact point between the top sealing lip 21 and this area is a dome opening 31. Located in the second groove 34 is a slide element 12. The slide element 12 is held in its position by the radially inward wall and the floor of the second groove 34, by the frame ring 20 and the top side of the upper sealing lip 21.

In the operating condition, an internal high pressure builds up, its escape being prevented by the seal 11. The top sealing lip 21 is protected against excessive deformation by the slide element 12, the lower sealing lip 22 by the diagonal inclination of the container rim 17.

The bracket 19 lies mostly in its radially inward displaced position, the top side of its locking area 29 lies on the bottom edge 30 of the shoulder extending downwardly at the outer rim of the container rim 17.

The cover 2 of the container 1 for the product to be cooked is pushed away by the internal pressure as well as by the seal 11; this movement is limited by contact between the locking area 29 and the lower edge 30.

After completing the cooking process, like in the first form of embodiment, the steam pressure cooking pot is first made partially pressureless. With further pushing down, the slide element 12 lifts the top sealing lip 21 from the dome 18, as is shown in FIG. 8. In this manner, the remaining internal pressure can escape through the dome openings 31.

When next rotating the cover 2 relative to the container 1 for the product to be cooked, the done 18 slides on the glide element 12 with only a slight force of friction opposing this sliding movement. On the other hand, seal 11, because of the greater frictional adhesion between the lower sealing lip 22 and the container rim 17, remains unrotated relative to this latter and, in turn, firmly holds the slide element 12.

Since seal 11 is not rotated, the frame ring 20 lying flatly thereupon is not rotated either. Fingers 23 prevent rotation of the brackets 19 relative to the container 1 for the product to be cooked, so that, over all, resulting is a rotation of dome and covering ring 25 relative to the totality of container 1 for the product to be cooked, seal 11, frame ring 20, brackets 19 and slide element 12. With this relative movement, the slide rings slide in slots 27 and push the brackets 19 outwardly.

Now, it is possible to lift off the entire sealing arrangement together with the cover 2; retaining seal 11 in the frame ring 20 prevents its falling out. Unlocking of the locking means with the high pressure that arises inside the pot is excluded.

If the cover 2 and the container 1 for the product to be cooked are not completely locked with one another, the top edges 28 of the shoulders 36 of the brackets 19 are in engagement with the lower edges 30 of the shoulders at the container rim 17. In this fashion, the cover 2 is drawn toward the container 1 for the product to be cooked, to the extent that the top sealing lip 21 is in its raised up position and no high pressure can build up inside the pot. The edges 28, 30, therefore, act like the stops 5 of the first example embodiment.

A third preferred form of embodiment comprises a rectangular container 50 for the product to be cooked, with rectangular cover 52. The cover 52 can be pushed on and/or pushed off of this latter in the longitudindal direction of the container 50 for the product to be cooked, and is held to the container by a horizontal shoulder 54 that grips under the container rim 56.

A pot of this type is, for example, known from German Pat. No. 28 01 173.

A seal 60 is firmly clamped to the cover 52 by a supporting element 72 lying between two sealing lips 62, 64. Located under the lower sealing lip 64 is a slide element 100 with lateral stubs 68 that project tongue-like through slots 58 in the rim of the cover 52 and hold the slide element 100. Seal 60 and slide element 100 follow the rectangular contour of the cover 52. Material stiffness and support for slide element 100 through means of stubs 68 are selected so that the lower sealing lip 64, with the cover pushed on, can lie against the container rim 56; on the other hand, however, there can be a slight tapering of the cover 52 toward the container 50.

The sealing function of the steam pressure cooking pot corresponds in operation completely with what has already been described. In the operating condition, contact of the lower sealing lip 64 with the container rim 56 prevents escape of the internal pressure.

Figure 11:
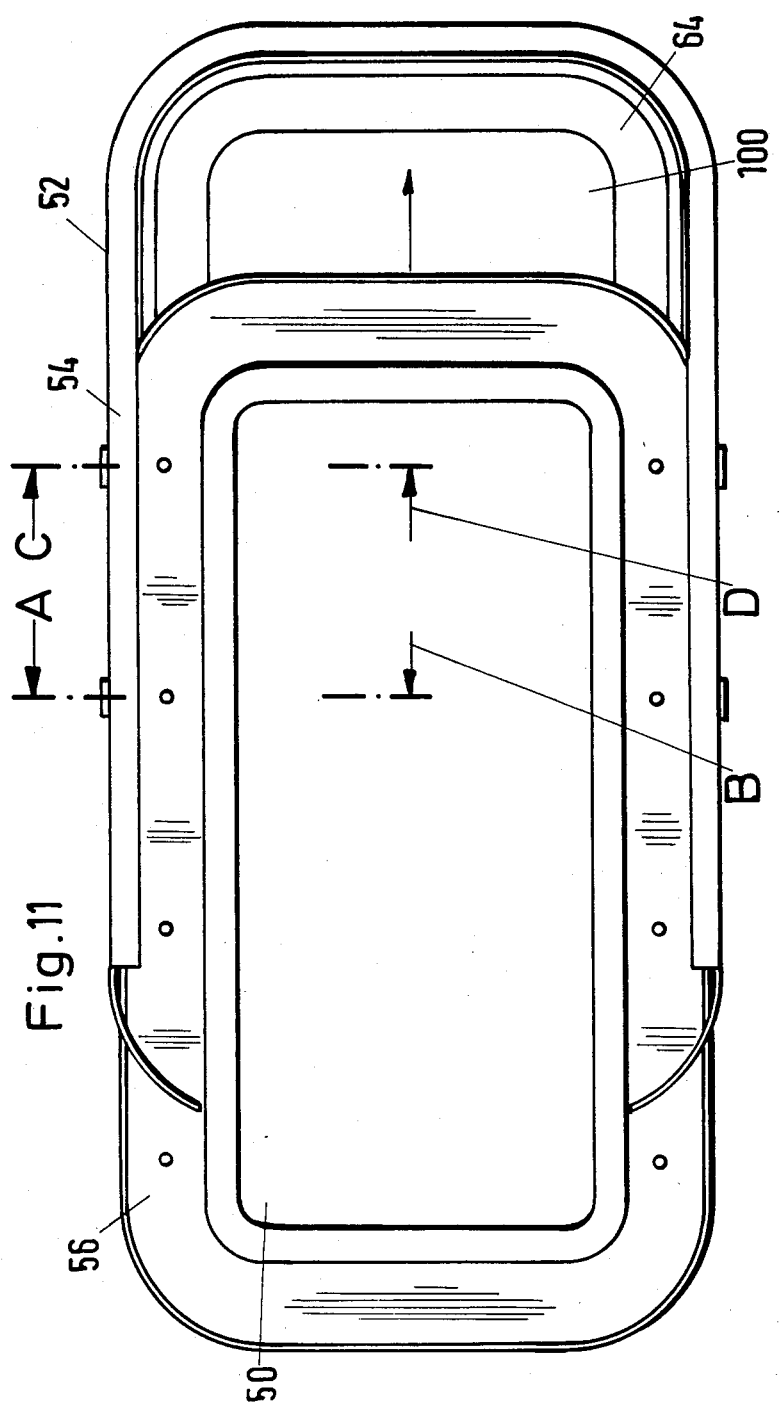
FIG. 11, a view corresponding to FIG. 9 with partially pushed off cover.

For opening, the cover 52—after actuating a relief valve that is not shown—is pressed down and the lower sealing lip 64 is lifted up from the container rim 56, whereby slide element 100 serves as a levered support. The remaining steam can escape through openings 70 in the container rim 56 (FIG. 12). The slide element 100 is additionally provided with recesses 66 on its side facing away from the lower sealing lip 64 which, together with the slots 58, form another possibility for the steam to escape. In the pushed down position, the cover 52 can, as FIGS. 11 and 12 show, then be completely pushed off from the container 50 for the product to be cooked.

In all examples of embodiment, the slide element can be integrated into the seal, for example by glueing on, vulcanizing on, or partially spraying on, or even manufacturing in one piece. Moreover, it is possible to substitute the slide element by a functionally corresponding, levered support-acting outforming (bump) on the cover or container rim.

I claim:

1. Steam pressure cooking pot consisting of a container accomodating the product to be cooked, a cover with safety valve capable of being placed thereupon, a locking (closing) means clamping container and cover to one another in the closed condition, and a seal disposed between cover and container securing the inside space of the pot against a drop in pressure in the closed condition, with a sealing lip of the seal pointing radially inwardly lying against the cover or the container which, upon pressing down the cover in the direction toward the container, lifts off the sealing emplacement on the cover or on the container and with the cover or container, upon subsequent movement of the cover into the opening condition, executing a relative movement toward the sealing lip, characterized by the fact that there is disposed ' radially outside the rim of the sealing lip (7; 21; 64), between the sealing lip (7; 21; 64) and the cover (2; 18) or the container (1; 17; 50), a slide (glide) element (12; 100) that acts as a levered support for the lifting movement of the sealing lip (7; 21; 64).

2. Steam pressure cooking pot according to claim 1, characterized by the fact that the slide element (12; 100) is ring-like and is disposed along the entire rim (19; 50 and/or 10) of the container (1; 50) and/or cover (2; 18).

3. Steam pressure cooking pot according to claim 1, characterized by the fact that the slide element (12; 100) displays a circular cross section.

4. Steam pressure cooking pot according to claim 1, characterized by the fact that the seal (11; 60) consists of an NBR-elastomer or silicone rubber and the slide element consists of stainless steel or plastic.

5. Steam pressure cooking pot according to claim 1, characterized by the fact that the slide element is integrated into the seal.

6. Steam pressure cooking pot according to claim 1, characterized by the fact that the surface of the slide element (12; 100) is broken up into lamellar or punctiform projections.

7. Steam pressure cooking pot according to claim 1, characterized by the fact that the slide element (12; 100) is disposed radially outside of openings (70; 31) provided in the container rim (56) or in the cover (2), said openings lying radially outside the free end edge of the associated sealing lip (64).

8. Steam pressure cooking pot according to claim 1, characterized by the fact that the slide element (100) engages, with outwardly projecting stubs (68), into grooves (58) of the cover (52).

9. Steam pressure cooking pot according to claim 1, characterized by the fact that a flat supporting element (72) is disposed between the sealing lips (62, 64).

10. Steam pressure cooking pot according to claim 1, characterized by the fact that the slide element consists of a levered support-like outforming of the cover and/or container rim.

11. Steam pressure cooking pot according to claim 1, characterized by the fact that the slide element (12; 100) is provided, on its side turned away from the associated sealing lip (64), with recesses (66).

* * * * *